US012576708B2

(12) United States Patent
Engerman et al.

(10) Patent No.: US 12,576,708 B2
(45) Date of Patent: Mar. 17, 2026

(54) ELECTRIC AXLE WITH COMPACT ELECTRIC MACHINE AND GEARBOX ARRANGEMENT

(71) Applicant: Dana Automotive Systems Group, LLC, Maumee, OH (US)

(72) Inventors: Eric M. Engerman, Plymouth, MI (US); Burke Smith, Bruce Township, MI (US)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 0 days.

(21) Appl. No.: 18/602,766

(22) Filed: Mar. 12, 2024

(65) Prior Publication Data

US 2024/0317045 A1     Sep. 26, 2024

Related U.S. Application Data

(60) Provisional application No. 63/491,887, filed on Mar. 23, 2023.

(51) Int. Cl.
| | |
|---|---|
| *B60K 17/04* | (2006.01) |
| *B60K 1/02* | (2006.01) |
| *B60K 6/365* | (2007.10) |
| *B60K 7/00* | (2006.01) |
| *F16H 3/72* | (2006.01) |
| *B60K 6/26* | (2007.10) |

(52) U.S. Cl.
CPC .............. *B60K 17/046* (2013.01); *B60K 1/02* (2013.01); *B60K 6/365* (2013.01); *B60K 7/0007* (2013.01); *F16H 3/727* (2013.01); *B60K 2006/266* (2013.01)

(58) Field of Classification Search
CPC .......... F16H 3/724; F16H 3/727; F16H 48/08; B60K 17/046; B60K 1/02; B60K 7/0007; B60K 2006/266; B60K 2007/0061
USPC ........ 475/150, 151, 204, 221; 180/65.6, 369
See application file for complete search history.

(56) References Cited

U.S. PATENT DOCUMENTS

| | | | |
|---|---|---|---|
| 8,007,391 | B2 | 8/2011 | Kikura et al. |
| 8,177,007 | B2 | 5/2012 | Abe et al. |
| 8,640,800 | B2 | 2/2014 | Armbruster et al. |
| 8,672,068 | B2 | 3/2014 | Janson |
| 9,234,565 | B2 | 1/2016 | Zhang et al. |
| 9,441,717 | B2 | 9/2016 | Smetana |
| 9,527,382 | B2 | 12/2016 | Smetana |
| 9,944,166 | B2 | 4/2018 | Janson et al. |
| 10,259,318 | B2 | 4/2019 | Frohnmayer et al. |
| 10,309,507 | B2 | 6/2019 | Scharr et al. |
| 10,479,180 | B2 | 11/2019 | Colavincenzo et al. |

(Continued)

FOREIGN PATENT DOCUMENTS

| | | |
|---|---|---|
| CN | 101519040 B | 12/2012 |
| CN | 105333064 A | 2/2016 |

(Continued)

*Primary Examiner* — Roger L Pang
(74) *Attorney, Agent, or Firm* — McCoy Russell LLP

(57)     ABSTRACT

Systems and methods for an electric axle. The electric axle includes, in one example, a first electric machine directly coupled to a sun gear of a planetary gear set and a second electric machine directly coupled to a carrier of a planetary gear set. The planetary gear set includes a set of planet gears that rotate on the carrier and an output gear that meshes with an input gear in a differential.

7 Claims, 5 Drawing Sheets

(56) References Cited

U.S. PATENT DOCUMENTS

| | | | |
|---|---|---|---|
| 10,480,631 B2 | 11/2019 | Dzafic et al. | |
| 10,630,140 B2 | 4/2020 | Pritchard et al. | |
| 10,781,890 B2 | 9/2020 | Lian et al. | |
| 2001/0006919 A1* | 7/2001 | Takenaka | B60K 6/445 |
| | | | 903/910 |
| 2003/0189388 A1* | 10/2003 | Hashimoto | H02K 16/00 |
| | | | 310/268 |
| 2005/0026742 A1 | 2/2005 | Tiesler et al. | |
| 2010/0025131 A1 | 2/2010 | Gloceri et al. | |
| 2011/0212803 A1* | 9/2011 | Maas | B60K 17/04 |
| | | | 475/149 |
| 2015/0217760 A1* | 8/2015 | Itagaki | B60W 10/107 |
| | | | 903/945 |
| 2018/0076701 A1 | 3/2018 | Hunter et al. | |
| 2019/0186617 A1 | 6/2019 | Verbridge et al. | |
| 2020/0031224 A1 | 1/2020 | Perry et al. | |
| 2021/0062723 A1 | 3/2021 | McCune | |
| 2021/0129665 A1 | 5/2021 | Kumar et al. | |
| 2021/0291635 A1 | 9/2021 | Ziech | |
| 2021/0362578 A1 | 11/2021 | Oldeide et al. | |
| 2022/0126663 A1 | 4/2022 | Mepham | |
| 2023/0294503 A1 | 9/2023 | Perakes et al. | |

FOREIGN PATENT DOCUMENTS

| | | |
|---|---|---|
| CN | 112706597 A | 4/2021 |
| CN | 113389880 A | 9/2021 |
| CN | 113400913 A | 9/2021 |
| DE | 102011007268 A1 | 10/2012 |
| DE | 102012220970 B4 | 3/2017 |
| DE | 102021004235 A1 | 10/2021 |
| DE | 102021121899 A1 | 3/2022 |
| EP | 1764253 B1 | 5/2012 |
| EP | 3587157 B1 | 6/2021 |
| WO | 2022023303 A1 | 2/2022 |

* cited by examiner

ELECTRIC AXLE WITH COMPACT ELECTRIC MACHINE AND GEARBOX ARRANGEMENT

CROSS REFERENCE TO RELATED APPLICATION

The present application claims priority to U.S. Provisional Application No. 63/491,887, entitled "ELECTRIC AXLE WITH COMPACT ELECTRIC MACHINE AND GEAR-BOX ARRANGEMENT", and filed on Mar. 23, 2023. The entire contents of the above-listed application are hereby incorporated by reference for all purposes.

TECHNICAL FIELD

The present disclosure relates to an electric axle that includes one or more electric machines and a gearbox with a space efficient architecture.

BACKGROUND AND SUMMARY

Segments of the vehicle market are moving towards electrification. However, the inventors have recognized that vehicle platform electrification presents investment costs and project management complexity that create challenges for automotive manufacturers and suppliers. The inventors have recognized that to manage this complexity, carrying over certain features of existing vehicle platforms when electrifying the platforms may be desirable in certain cases. However, the inventors have recognized that the carry-over of these components may create packaging challenges. Specifically, features of certain hybrid powertrains and their internal combustion engine counterparts may impose space constraints on electric axles such as electrified rigid beam axles.

The inventors have recognized the abovementioned challenges and developed an electric axle (e.g., an electric beam axle) to at least partially overcome the challenges. The electric axle includes, in one example, a first electric machine directly coupled to a sun gear of a planetary gear set. The electric axle further includes a second electric machine directly coupled to a carrier of a planetary gear set. Further, in the electric axle the planetary gear set includes a set of planet gears that rotate on the carrier and an output gear that meshes with an input gear in a differential. In this way, the electric axle is constructed in a space efficient package that achieves desired performance targets.

In another example, an electric axle is provided that includes a first electric machine directly coupled to a first planetary gear set. In such an example, the electric axle further includes a second electric machine directly coupled to a second planetary gear set. Further, in this example, the first and second planetary gear sets include a first carrier and a second carrier, respectively, that are rotationally coupled to an output gear that meshes with an input gear of a differential. In this way, a compact gear train is achieved.

Further, in one example, the electric axle includes an electric machine with two output shafts that are each coupled to a rotor shaft on opposing axial sides of the electric machine. In such an example, the electric axle further includes a first gear train rotationally coupled to the first output shaft and a second gear train rotationally coupled to the second output shaft. In this way, the electric axle achieves a space efficient architecture.

Further in one example, the electric axle may be incorporated into a support structure with slots on lateral sides of the structure to enable suspension movement. This support structure may further be configured to mate with a portion of an internal combustion engine (ICE) and a lubricant pan, for example, when the support structure is used in ICE platforms, in other embodiments. The use of the support structure increases the assembly's adaptability with regard to powertrain configuration. In other words, the support structure may be used across multiple vehicle platforms, if desired. Consequently, economies of scale manufacturing gains may be leveraged, if desired.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Powertrains are described herein which include space efficient electric axles that have architectures designed for incorporation into a support structure while achieving target performance characteristics. Specifically, the electric axles are profiled to be incorporated into the support structure which may be used in vehicles with the electric powertrain architectures described herein, which may take the form of an all-electric powertrain or a P4 hybrid electric powertrain. The support structure may also be used in internal combustion engine (ICE) powertrains, in alternate embodiments. As such, the support structure and electric axle assembly are adapted for use in a wider variety of vehicle platforms, thereby increasing customer appeal and allowing the assembly to leverage economies of scale cost efficiencies in relation to manufacturing. The electric axle may have lateral length that enables the axle to be incorporated into a recess between axially opposing protrusions that form sides of the support structure (e.g., a cradle).

Figure 1:
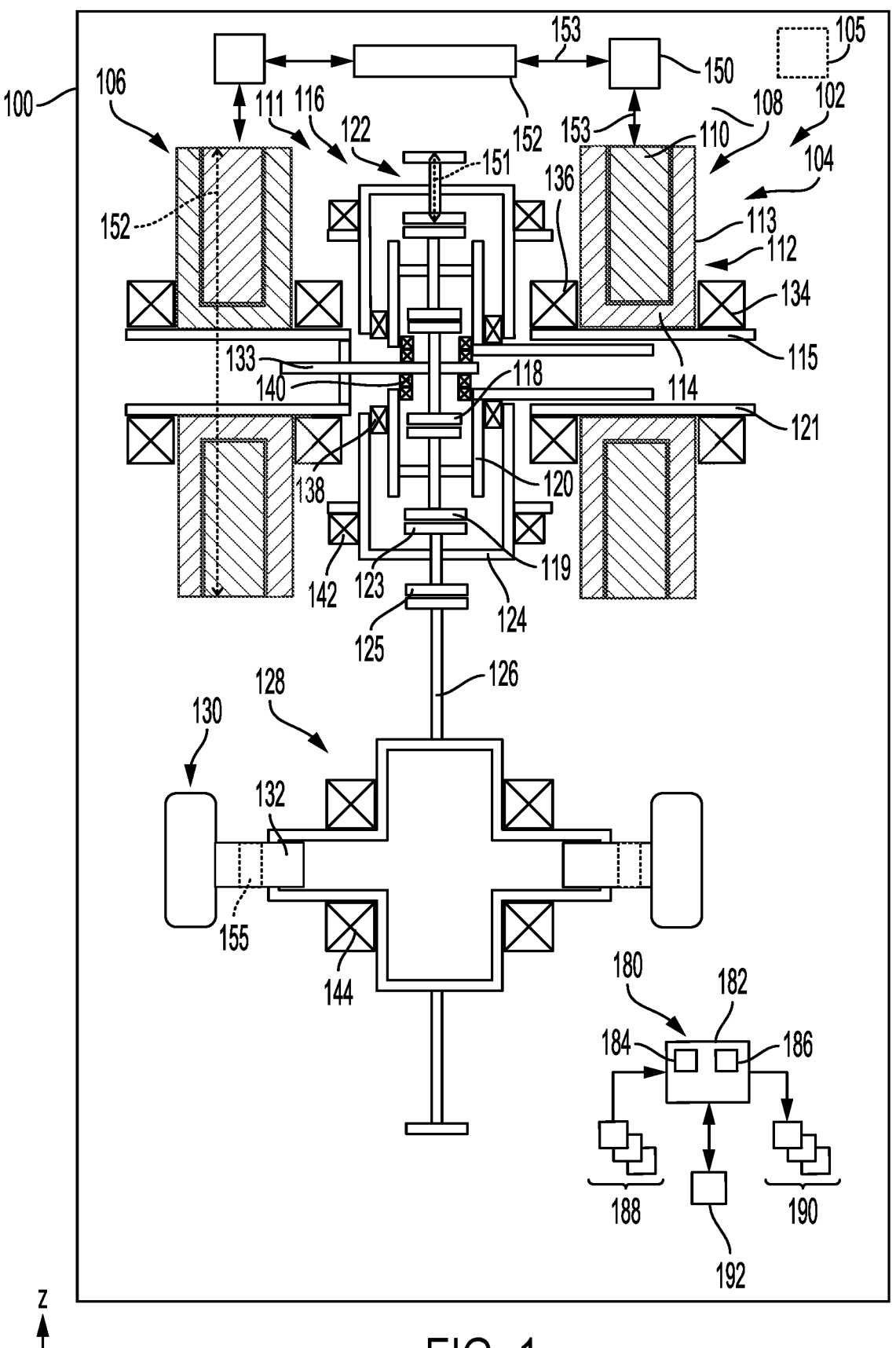
FIG. 1 shows an illustration of a vehicle with a first example architecture of an electric axle.
Figure 2:
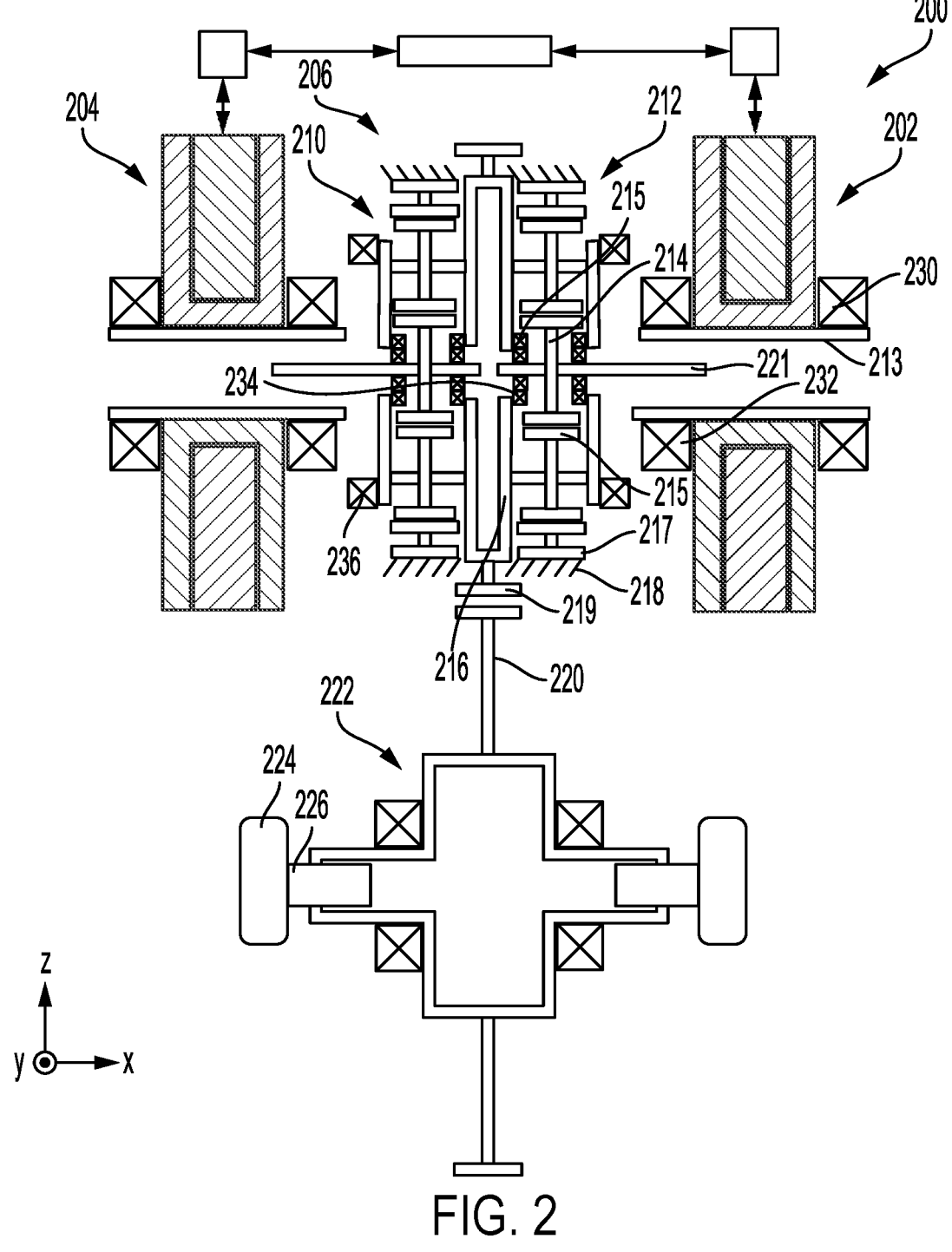
FIG. 2 shows a second example architecture of an electric axle.
Figure 3:
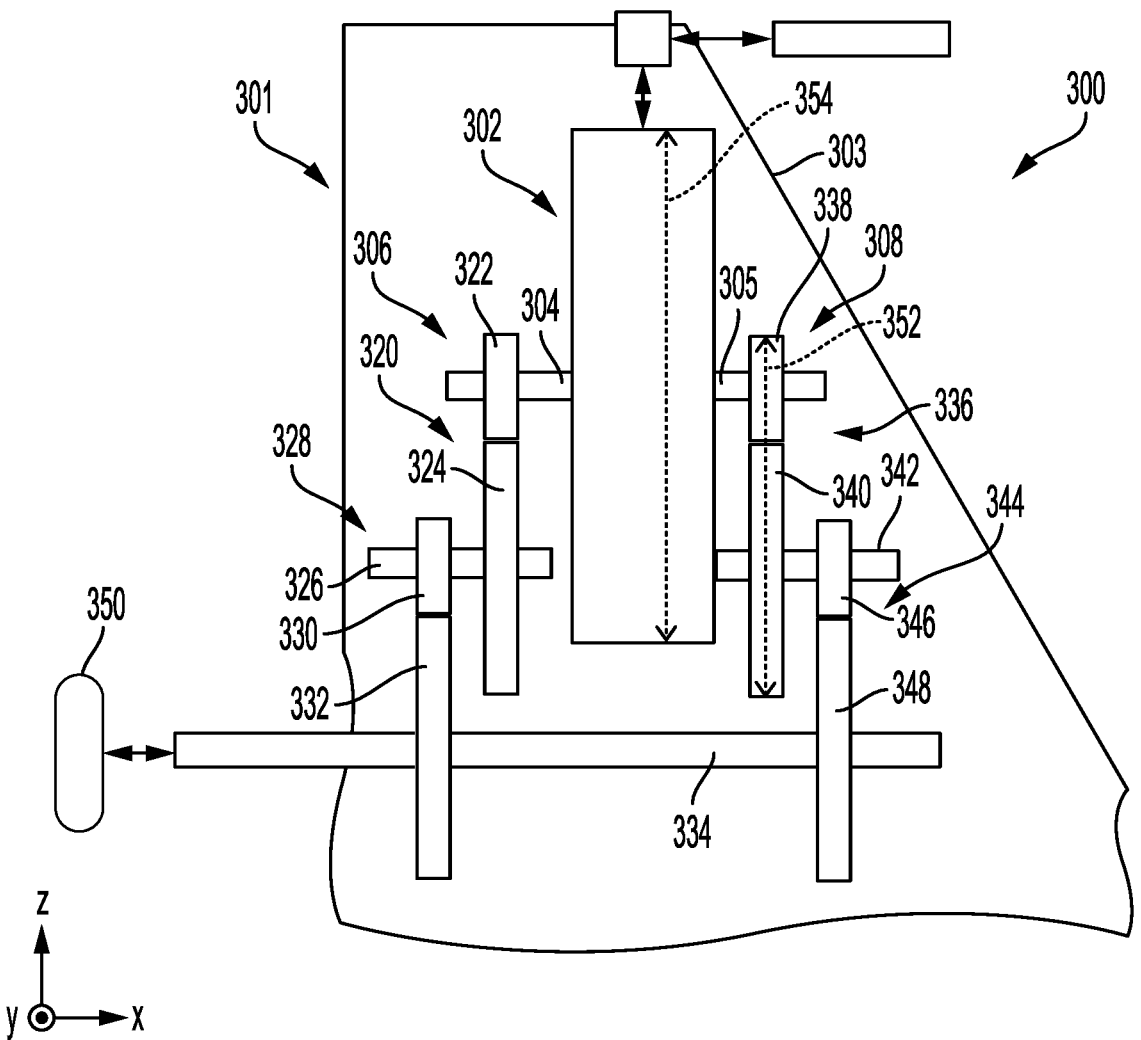
FIG. 3 shows a third example architecture of an electric axle.

FIG. 1 shows a vehicle with a first example of an electric axle. FIGS. 2 and 3 show different examples of electric axle architectures. FIGS. 4-7 show different detailed views of a support structure in which the electric axle may be incorporated. FIGS. 4-7 are drawn approximately to scale, in the illustrated embodiment. However, at least a portion of the illustrated components may have other relative dimensions, in other embodiments.

FIG. 1 shows a schematic depiction of a vehicle 100 which includes a powertrain 102 with an electric axle 104. The stick diagram of FIG. 1 provides a topology of the vehicle, the powertrain, the electric axle, and corresponding components.

As described herein an electric axle is an electric drive incorporated into an axle. The electric axle may be an electric beam axle, in one example. A beam axle may be an axle with mechanical components which structurally support one another and extend between drive wheels. For instance, the beam axle may be a structurally continuous structure that spans the drive wheels on a lateral axis, in one embodiment. Thus, wheels coupled to the axle may move in unison when articulating, during, for example, vehicle travel on uneven road surfaces. The beam axle may be coupled to a dependent suspension system 105, in one example. The dependent suspension system may include shock absorbers, dampers, and the like that are coupled to the beam axle. Therefore, the electric axle may be an unsprung mass. In such an example, the camber angle of the wheels may remain substantially constant as the suspension moves through its travel. Similar dependent suspension systems may be included in the other electric axles described herein.

The electric axle 104 includes a first electric machine 106 and a second electric machine 108. As illustrated, each of the electric machines may specifically be designed as an axial flux electric motor-generator due to their decreased axial length, efficiency gains, and lower weight when compared to radial flux motors. Further, each of the electric machines may have similar component designs and sizing to increase manufacturing efficiency. However, other types of electric machines may be used in alternate examples, such as transverse flux motors or radial flux motors. However, when radial flux motors are utilized, the axle's axial length may be increased. Further, in certain examples, electric machines with different configurations may be utilized in the electric axle. The rotor shafts of the electric machines may not be directly coupled to one another. In this way, the tractive performance of the electric axle is able to be increased, if desired.

In the illustrated axial flux electric motor example, the motors each include a stator 110 and a rotor 112. The rotors 112 each include radially aligned sections 113, an axially aligned sections 114, and a rotor shaft 115. Specifically, the rotor sections 114 of each of the axial flux motors are positioned on opposing axial sides of the stator, thereby axially capturing the stator 110. The stator 110 specifically includes winding positioned between the axially rotor sections 113. In this way, the axial flux motors achieve a compact length, along their rotational axes.

The electric axle 104 further includes a gearbox 111 coupled e.g., directly coupled) to the first electric machine 106. As described herein with regard to rotating components, coupling two components to one another denotes that mechanical power is able to pass between these components. The gearbox 111 is illustrated as a planetary gear set. Therefore, in the illustrated example, the planetary gear set 116 includes a sun gear 118 that meshes with a set of planet gears 119. The planet gears in the set of planet gears 119 are coupled to a carrier 120 such that they are able to rotate thereon. To enable the rotation between the planet gears in the set of planet gears 119 and the carrier 120 as well as the other planet gears and carriers described herein, bearings (e.g., needle roller bearings) may be positioned on the carrier. These bearings are designed to support and permit rotation of the corresponding planet gears. As such, the bearings may include races, roller elements (e.g., needle rollers, cylindrical rollers, tapered cylindrical rollers, or balls), and the like. The other bearings described herein may include similar components.

The sun gear 118 is rotationally coupled (e.g., splined, bolted, welded, combinations thereof, and the like) to the rotor 115 of the first electric machine 106 via a shaft 133. The rotor 112 of the second electric machine 108 is rotationally coupled to the carrier 120. In this way, the electric machines may be effectively connected to the gearbox 111. To elaborate, coupling the planetary gear set to the motors in this manner allows the planetary gear set to sum the inputs from the motors, thereby increasing electric axle performance.

The planetary gear set 116 further includes a ring gear 122 that rotates on a shaft 124. The ring gear 122 includes inner teeth 123 which mesh with the set of planet gears 119. The ring gear 122 further includes outer teeth 125 that mesh with an input gear 126 of a differential 128. The differential 128 is rotationally coupled to drive wheels 130 via axle shafts 132. The outer diameter 151 of the ring gear 122 may be less than the outer diameters 152 of the first and second electric machines 106 and 108. The outer diameters 152 of the electric machines are substantially equivalent in the illustrated example. In this way, the electric axle achieves a compact profile that is able to be effectively incorporated into a support structure which is discussed in greater detail herein with regard to FIGS. 4-7. The differential 128 shown in FIG. 1 and the other differentials described herein may be open differentials, locking differentials, limited slip differentials, and the like. The type of differential used in the electric axle 104 may be based on the vehicle platform's end-use design goals, such as packaging targets, performance targets, and the like. The planetary gear set 116 are arranged in a configuration which allows the inputs from the motors to be summed thereby increasing the system's torque. As a result, the performance of the electric axle is enhanced.

Further, the gearbox 111 does not include clutches to decrease electric axle complexity and increase the gearbox's space efficiency, in the illustrated example. However, in other examples, the gearbox may include one or more clutches to enable the gearbox's ratio to be altered to increase motor efficiency, which may however increase the axle's size, complexity, and likelihood of component degradation. Put another way, the gearbox 111 is illustrated as a single speed gearbox that may enable the electric axle to achieve desired packaging demands of a support structure 400, shown in FIGS. 4-7 and described in greater detail herein. However, in other examples, the gearbox may be a multi-speed gearbox that includes one or more clutches, as previously indicated.

Bearings 134 and 136 may be coupled to inner and outer axial sides of the rotor shafts 121 of the first electric machine 106 and the second electric machine 108. To elaborate, the bearings 134 and 136 are directly coupled to the rotor shafts 115 and the radially aligned sections 113 of the rotors in the illustrated example. However, other bearings arrangement with regard to the axial flux motors are possible.

Bearings 138 (e.g., thrust bearings) may be coupled to the carrier 120. Additionally, bearings 140 may be coupled to the shaft 133 which provides the mechanical connection between the electric machine 106 and the sun gear 118. Further, bearings 142 may be coupled to the shaft 124 to enable rotation thereof. Bearings 144 may additionally be coupled to the differential 128 or incorporated therein to enable axle shaft rotation.

The aforementioned bearings as well as the other bearings described herein may include components such as inner races, outer races, roller elements, as indicated above. It will be appreciated that the size and/or construction of the bearings may be selected based on expected rotational speeds of the components to which they are attached, packaging constraints, and the like. As such, the size and/or configuration of at least a portion of the bearings may vary, in some cases. However, at least a portion of the bearings may have similar sizes and/or constructions.

As illustrated in FIG. 1, the first electric machine 106 and the second electric machine 108 may be electrically coupled to inverters 150, respectively. These inverters are designed to convert direct current (DC) electric power to alternating current (AC) electric power and vice versa. As such, the electric machines 106 and 108 may be AC electric machines, in one example. However, in other examples, the electric machine may be DC electric machines and the inverters may therefore be omitted from the powertrain, in such an example. The inverters 150 may receive electric energy from one or more energy storage device(s) 152 (e.g., traction batteries, capacitors, combinations thereof, and the like). Arrows 153 signify the electric energy transfer between the electric machines 106 and 108, the inverters 150, and the energy storage device(s) 152 that may occur during different modes of system operation. As such, during a drive mode electric energy may flow from the energy storage device(s) 152 to the electric machines 106 and 108 by way of the inverters 150 and during a regenerative mode, electric energy may flow in the opposite direction from the electric machines to the energy storage devices. The other electric machines described herein may be similarly electrically coupled to inverters which are electrically coupled to energy storage devices.

The electric axle 104 may be a front axle in one example. In such an example, the axle may include steering system components such as joints 155 (e.g., universal joints, constant velocity joints, and the like), a steering cylinder, steering knuckles, and the like.

The vehicle 100 may also include a control system 180 with a controller 182. The controller 182 includes a processor 184 and memory 186. The memory 186 may hold instructions stored therein that when executed by the processor cause the controller 182 to perform the various methods, control techniques, and the like, described herein. The processor 184 may include a microprocessor unit and/or other types of circuits. The memory 186 may include known data storage mediums such as random access memory, read only memory, keep alive memory, combinations thereof, and the like.

The controller 182 may receive various signals from sensors 188 positioned in different locations in the vehicle 100, the powertrain 102, and the electric axle 104. The sensors may include electric machine speed sensors, energy storage device temperature sensor(s), an energy storage device state of charge sensor(s), wheel speed sensors, and the like. The controller 182 may also send control signals to various actuators 190 coupled at different locations in the vehicle 100, the powertrain 102, and the electric axle 104. For instance, the controller 182 may send signals to the inverters 150, 152 to adjust the rotational speed of the electric machines 106 and 108. In response to receiving the control commands, the other controllable components in the vehicle and powertrain may function in a similar manner with regard to command signals and actuator adjustment.

The vehicle 100 may also include one or more input device(s) 192 (e.g., an accelerator pedal, a brake pedal, a console instrument panel, a touch interface, a touch panel, a keyboard, combinations thereof, and the like). The input device(s) 192, responsive to driver input, may generate an acceleration adjustment request. The other electric axles described herein may include a similar control system with a controller, sensors, actuators, and input devices. Redundant description of the control system is omitted for brevity.

An axis system is provided in FIG. 1, as well as FIGS. 2-7, for reference. The z-axis may be a vertical axis (e.g., parallel to a gravitational axis), the x-axis may be a lateral axis (e.g., horizontal axis), and/or the y-axis may be a longitudinal axis, in one example. However, the axes may have other orientations, in other examples.

FIG. 2 shows another example of an electric axle 200. The electric axle 200 again includes two electric machines 202 and 204 which may have a similar construction to the electric machines, shown in FIG. 1. To elaborate, the electric machines are axial flux motors in the illustrated example. Therefore, redundant description of the overlapping components in the electric axle depicted in FIG. 2 is omitted for brevity.

The electric axle 200 further includes a gearbox 206 with a first planetary gear set 210 and a second planetary gear set 212. The planetary gear sets have a similar architecture in the illustrated example and have a symmetric arrangement with regard to the x-axis. To elaborate, the planetary gear sets are simple planetary gear sets in the illustrated example. In this way, the gear set space efficiency is increased, when compared to more complex planetary gear sets, such as compound planetary gear sets, for instance. The planetary gear sets may have other configurations, in alternate examples.

The planetary gear sets 210 and 212 include sun gears 214 which are rotationally coupled to rotor shafts 213 of the electric machines 202 and 204 via shafts 221. The sun gears 214 mesh with corresponding planet gears 215 that are correspondingly coupled to carriers 216. The planet gears 215 mesh with corresponding ring gears 217 which are grounded via a component 218 (e.g., gearbox housing) in the illustrated example. However, other planetary gear set architectures may be used in other examples. The planetary gear sets 210 and 212 are arranged in a configuration which allows the inputs from the motors to be summed thereby increasing the system's torque. Consequently, the electric axle 200 achieves increased performance.

The carriers 216 are both directly coupled to an output gear 219 which meshes with an input gear 220 of a differential 222. The differential 222 is rotationally coupled to drive wheels 224 via axle shafts 226.

Bearings 230 and 232 are again coupled to opposing axial sides of the electric machines 202 and 204. Bearings 234 are further coupled to opposing axial sides of each of the sun gears 214. Additionally, bearings 236 are coupled to each of the carriers 216. However, other bearings arrangements have been contemplated.

FIG. 3 shows another example of an electric axle 300 which is incorporated into a support structure 301. Specifically, the electric axle 300 is incorporated into a vertical extension 303 of the support structure 301, in the illustrated example. A more detailed example of a support structure is shown in FIGS. 4-7 and discussed in greater detail herein.

The electric axle 300 includes an electric machine 302 with two output shafts 304 and 305 on opposing axial sides of the machine. The electric axle further includes gear trains 306 and 308 positioned on opposing sides of the electric machine. The gear trains 306 and 308 include multiple gear reductions (e.g., a two-stage reduction) with idler shafts 326 and 342. Positioning the gear trains in this manner allows loads to be more evenly balanced in the axle, thereby increasing axle longevity. The load balancing functionality of the gear trains 306 and 308 are expanded upon herein.

In the illustrated example, the gear train 306 includes a first stage 320 with a gear 322 that is coupled the output shaft 304 and a gear 324 that is coupled to an idler shaft 326 and meshes with the gear 322. A second stage 328 in the gear train 306 includes a gear 330 that is coupled to the idler shaft 326 and a gear 332 that is coupled to a cross-over shaft 334 which connects the outputs of the gear trains 306 and 308. In other examples, the gear trains may include additional stages which may however decrease the axle's space efficiency.

The gear train 308 similarly includes a first stage 336 which includes a gear 338 which is coupled to the output shaft 305 and a gear 340 that is coupled to an idler shaft 342. The gear train 308 includes a second stage 344 which includes a gear 346 which is coupled to the idler shaft 342 and a gear 348 which is coupled to the cross-over shaft 334.

The cross-over shaft 334 may be coupled to a drive wheel 350 either via a final stage gear reduction or is directly coupled thereto. An outer diameter 352 of the first stage 320 may be greater than an outer diameter 354 of the electric machine 302 to allow the electric machine to be space efficiently incorporated into the electric axle.

The cross-over shaft 334 may extend across a lower side of the electric machine 302 and has gears in the first and second gear trains coupled thereto. Further, the electric axle 300 may have a mirrored an electric machine and gear train layout on the other side of the support structure 301 which drives another wheel. As such, the electric axle 300 may have two separate drive units for each drive wheel which each include similar gear reductions on opposing sides of the motors and a cross-over shaft.

FIGS. 4-7 show an exemplary support structure 400. Any of the abovementioned electric axles may be incorporated into the support structure 400. Incorporating the electric axles into the support structure allows the axles cross-platform development costs to be reduced due to the support structures ability to be used in hybrid powertrains and ICE powertrains.

Figures 4, 5:
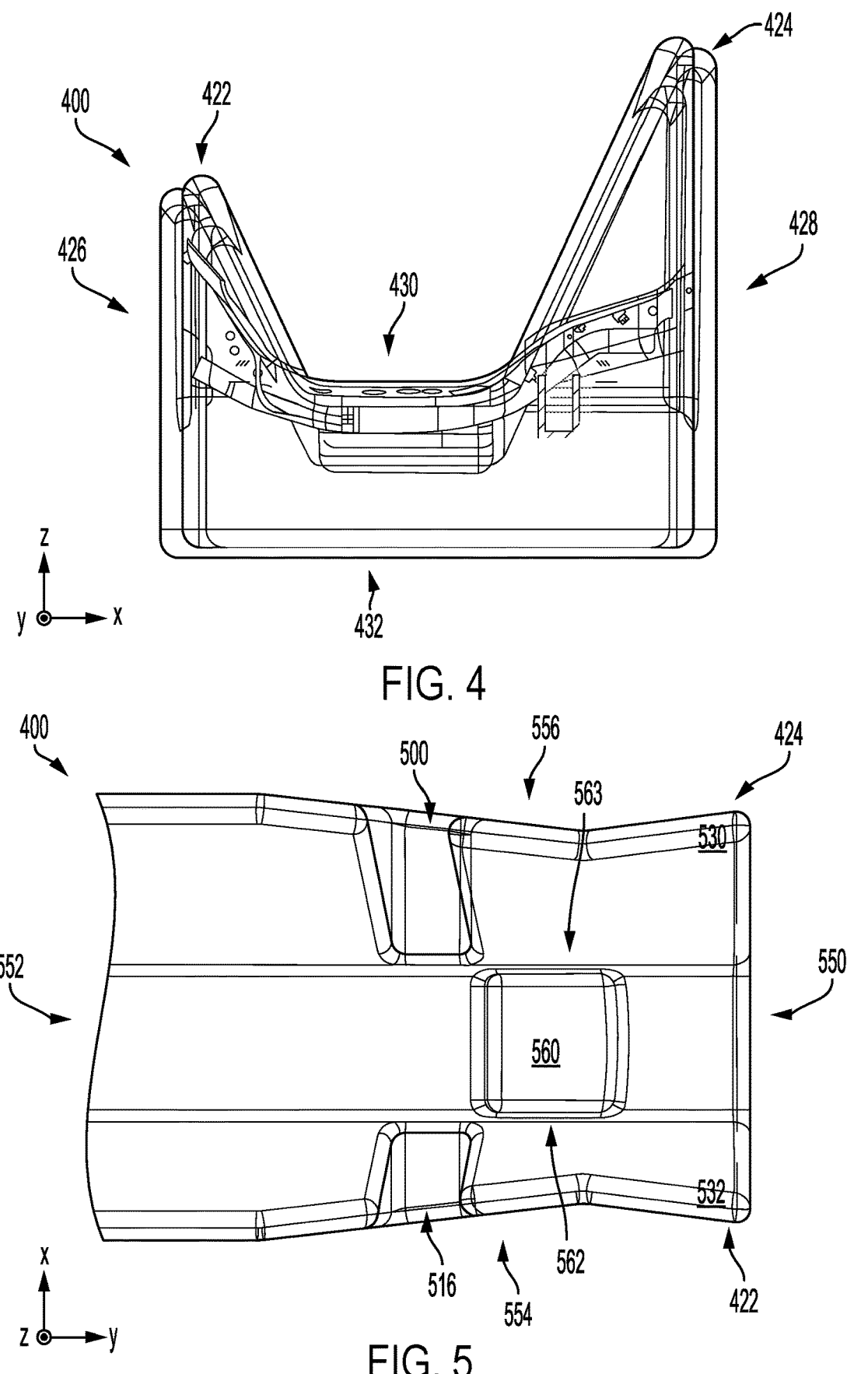
FIGS. 4-7 show different detailed views of an example of a support structure with electric machines of an electric axle incorporated therein.

FIG. 4 shows the support structure 400 with a first vertically extending protrusion 422 and a second vertically extending protrusion 424. These protrusions are positioned on lateral sides 426 and 428 of the support structure 400. Further, these protrusions may have unequal heights to avoid the structure's interference with adjacent vehicle systems.

A recess 430 in the support structure 400 is further illustrated in FIG. 4. Sections of this recess 430 are positioned within as well as vertically below the vertically extending protrusions 422, 424. A bottom side 432 of the support structure 400 is further illustrated in FIG. 4.

FIG. 5 shows a top view of the support structure 400. The slots 500 and 516 are shown on opposing lateral sides of the support structure 400. The recess 430 is further illustrated in FIG. 5. The engine recess 430 may be positioned longitudinally in front of the slots 500, 516. The slots accommodate for jounce in regard to the suspension system (e.g., dependent suspension system).

The support structure 400 may be demarcated into a front side 550, a rear side 552, a first lateral side 554, and a second lateral side 556. Any of the electric axles described above may specifically be incorporated into the support structure 400 in front of the slots 500 and 516. Further, the electric axles described herein may be at least partially arranged below a recess 560. The recess 560 may be shaped to receive an oil pan when an ICE is incorporated into the support structure. In this way, the support structure is able to be used in different powertrain platforms.

The electric axles described herein may be positioned in front of the slots 500, 516 to increase system compactness and avoid interference with the suspension system. To elaborate, the electric axles may be arranged in front of the slots 500, 516 and on one of the sides 562 and 563 of the recess 560. Thus, in such an example, the electric axle may be positioned laterally outboard of the recess 560.

FIG. 5 further shows the first and second vertically extending protrusions 422, 424. Inner surfaces 530, 532 of these protrusions 422, 424 may form a cradle structure that may wrap around and/or mate with other powertrain components (e.g., a lubricant pan, a transmission, and the like), as previously discussed. The electric axle may be incorporated into the vertically extending protrusions 422, 424. The motors (e.g., axial flux motors) in the electric axles described above may be included in one or both of the vertically extending protrusions to increase the powertrain's space efficiency. Axial flux motors may be particularly suited for incorporation into the vertically extending protrusions due to their decreased axial length when compared to radial flux motors.

Figure 6:
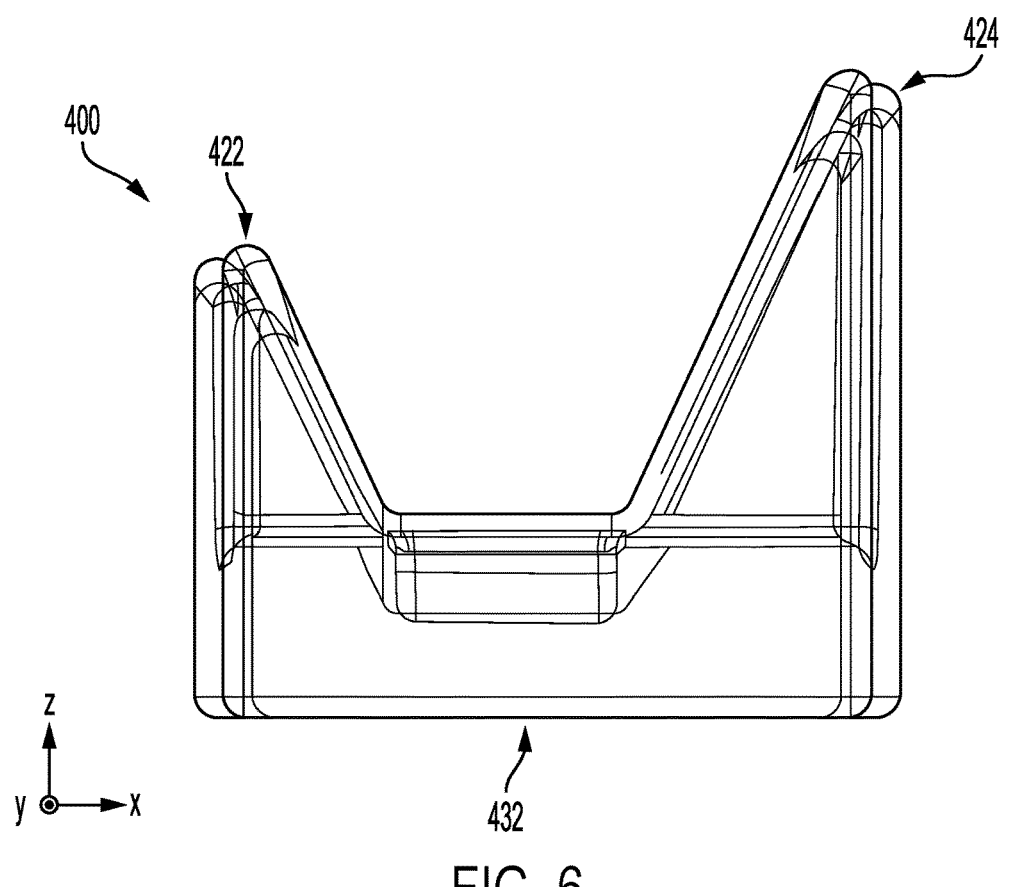

FIG. 6 shows the support structure 400. The vertically extending protrusions 422, 424 are again illustrated along with a bottom side 432 of the support structure 400.

Figure 7:
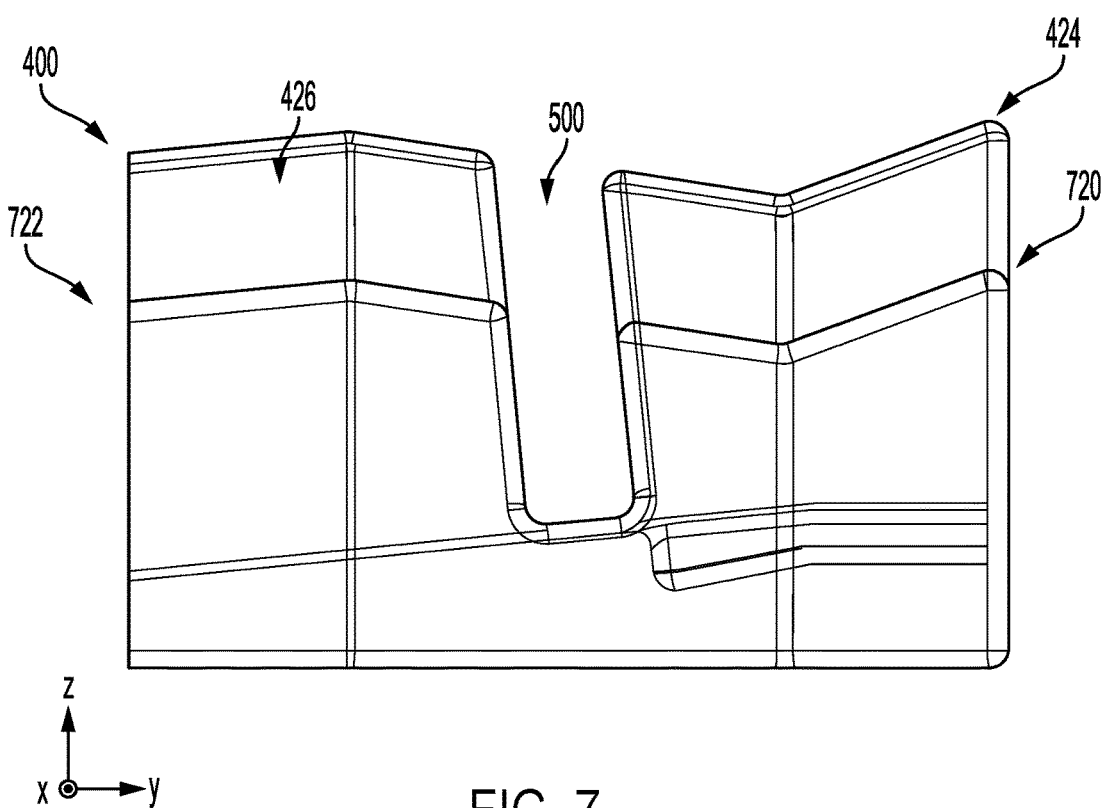

FIG. 7 shows the lateral side 426 of the support structure 400. The slot 500 extends vertically down the lateral side 426. It will be understood that another slot 516, shown in FIG. 7 may extend vertically down the opposing lateral side of the support structure 400. The vertically extending protrusion 424 is shown positioned in front of the slot 516 with regard to an axis that is parallel to the y-axis. FIG. 7 further shows a front side 720 and a rear side 722 of the support structure 400.

The electric axles and associated vehicle systems and more specifically powertrain systems, components, and the like may provide for an operating method of an electric axle that includes operating a first axial flux electric motor-generator and a second axial flux motor-generator based on an acceleration request, where the electric axle includes the first and second axial flux motor-generators directly coupled to a corresponding planetary gearbox.

The technical effect of the electric drive axle and operating method described herein is to achieve a space efficient axle package with desired performance characteristics which can be incorporated into a support structure that is designed for use in both full-electric vehicle platforms, hybrid electric vehicle platforms, and internal combustion engine (ICE) vehicle platforms.

FIGS. 1-7 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another.

As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The invention will be further described in the following paragraphs. In one aspect, an electric axle is provided that comprises a first electric machine directly coupled to a sun gear of a planetary gear set; and a second electric machine directly coupled to a first carrier of a planetary gear set; wherein the planetary gear set includes a first set of planet gears that rotate on the first carrier and a second set of planet gear that mesh with an input gear in a differential.

In another aspect, an electric axle is provided that comprises a first electric machine directly coupled to a first planetary gear set; and a second electric machine directly coupled to a second planetary gear set; wherein the first and second planetary gear sets include a first carrier and a second carrier that are rotationally coupled to an output gear that meshes with an input gear of a differential.

In yet another aspect, an electric axle is provided that comprises an electric machine including two output shafts coupled to a rotor shaft on opposing axial sides of the electric machine; a first gear train rotationally coupled to the first output shaft; and a second gear train rotationally coupled to the second output shaft.

In any of the aspects or combinations of the aspects, the electric axle may be a single speed electric axle.

In any of the aspects or combinations of the aspects, the planetary gear set may include a second carrier that is directly coupled to the second electric machine.

In any of the aspects or combinations of the aspects, the electric axle may further include a support structure including an axle recess that at least partially enclosing the electric axle.

In any of the aspects or combinations of the aspects, the first electric machine and the second electric machine may be axial flux motors.

In any of the aspects or combinations of the aspects, the electric axle may be a single speed electric axle.

In any of the aspects or combinations of the aspects, the first and second planetary gear sets may be simple planetary gear sets.

In any of the aspects or combinations of the aspects, a first ring gear and a second ring gear in the first and second planetary gear sets may be grounded.

In any of the aspects or combinations of the aspects, the first and the second gear trains may not include clutches.

In any of the aspects or combinations of the aspects, the first and the second gear trains may each only include a first stage and a second stage.

In any of the aspects or combinations of the aspects, the electric axle may further include a cross-over shaft that extends axially across a side of the electric machine and is coupled to a first gear which is included in the first gear train and a second gear which is included in the second gear train.

In any of the aspects or combinations of the aspects, the cross-over shaft may be positioned vertically below the electric machine.

In any of the aspects or combinations of the aspects, the electric axle may be a front axle positioned in a vertically extending protrusion of a support structure.

In any of the aspects or combinations of the aspects, gears in the first and the second gear trains may be helical gears.

In any of the aspects or combinations of the aspects, the output shaft may be positioned vertically below the electric machine.

Note that the example control and estimation routines included herein can be used with various powertrain, transmission, and/or vehicle system configurations. The control methods and routines disclosed herein may be stored as executable instructions in non-transitory memory and may be carried out by the control system including the controller in combination with the various sensors, actuators, and other vehicle hardware. Further, portions of the methods may be physical actions taken in the real world to change a state of a device. The specific routines described herein may represent one or more of multiple processing strategies. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the vehicle control system, where the described actions are carried out by executing the instructions in a system including the various hardware components in combination with the electronic controller. One or more of the method steps described herein may be omitted if desired.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, these specific examples are not to be considered in a limiting sense, because numerous variations are possible. For example, the above technology can be applied to powertrains that include different types of propulsion sources including different types of electric machines and engines (e.g., internal combustion engines). The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electric axle comprising:

a first electric machine directly coupled to a sun gear of a planetary gear set; and a second electric machine directly coupled to a carrier of the planetary gear set;

wherein the planetary gear set includes a set of planet gears that rotate on the carrier and a ring gear that meshes with an input gear in a differential;

wherein the first electric machine, the second electric machine, and the planetary gear set are coaxially arranged;

wherein the ring gear includes:

inner teeth that mesh with gears in the set of planet gears; and outer teeth that mesh with the input gear of the differential; and wherein the inner teeth and the outer teeth are radially aligned.

2. The electric axle of claim 1, wherein the electric axle is a single speed electric axle.

3. The electric axle of claim 1, wherein a rotor of the second electric machine is rotationally coupled to the carrier of the planetary gear set.

4. The electric axle of claim 1, further comprising a support structure at least partially enclosing the electric axle.

5. The electric axle of claim 1, wherein the first electric machine and the second electric machine are axial flux motors.

6. The electric axle of claim 1, wherein the electric axle is an electric beam axle.

7. The electric axle of claim 1, wherein the planetary gear set is a simple planetary gear set.

* * * * *